United States Patent
Liu et al.

(10) Patent No.: US 12,381,601 B2
(45) Date of Patent: Aug. 5, 2025

(54) BEAM CONTROL METHOD AND SYSTEM OF ARRAY ANTENNA BASED ON FREQUENCY DIVERSITY, AND BEAM CONTROLLER

(71) Applicant: PURPLE MOUNTAIN LABORATORIES, Jiangsu (CN)

(72) Inventors: Shengheng Liu, Jiangsu (CN); Yongming Huang, Jiangsu (CN); Zihuan Mao, Jiangsu (CN); Tianheng Ni, Jiangsu (CN); Xiaohu You, Jiangsu (CN)

(73) Assignee: PURPLE MOUNTAIN LABORATORIES, Jiangsu (CN)

( * ) Notice: Subject to any disclaimer, the term of this patent is extended or adjusted under 35 U.S.C. 154(b) by 0 days.

(21) Appl. No.: 18/276,186

(22) PCT Filed: Oct. 15, 2021

(86) PCT No.: PCT/CN2021/124026
§ 371 (c)(1),
(2) Date: Aug. 7, 2023

(87) PCT Pub. No.: WO2022/170783
PCT Pub. Date: Aug. 18, 2022

(65) Prior Publication Data
US 2024/0113748 A1    Apr. 4, 2024

(30) Foreign Application Priority Data
Feb. 9, 2021 (CN) .......................... 202110173525.5

(51) Int. Cl.
*H04B 7/0408* (2017.01)
*H04B 7/06* (2006.01)

(52) U.S. Cl.
CPC ......... *H04B 7/0408* (2013.01); *H04B 7/0617* (2013.01)

(58) Field of Classification Search
CPC ....... H04B 7/0408; H04B 7/0617; H04B 7/12
See application file for complete search history.

(56) References Cited

U.S. PATENT DOCUMENTS

| 2020/0049812 A1 | 2/2020 | Jansen |
| 2020/0142051 A1* | 5/2020 | Anderson ............. G01S 13/867 |
| 2024/0310503 A1* | 9/2024 | Huang .................. G01S 13/347 |

FOREIGN PATENT DOCUMENTS

| CN | 102694588 A | 9/2012 |
| CN | 106972882 A | 7/2017 |

(Continued)

OTHER PUBLICATIONS

Si Qin, Yimin D. Zhang, Moeness G. Amin, and Fulvio Gini "Frequency Diverse Coprime Arrays with Coprime Frequency Offsets for Multi-Target Localization", 2016 IEEE Radar Conference (RadarConf), Jun. 9, 2016 (Year: 2016).*

(Continued)

*Primary Examiner* — Aristocratis Fotakis
(74) *Attorney, Agent, or Firm* — The Sun IP Law (57) ABSTRACT

Provided is an improved beam control method of an array antenna based on frequency diversity. The method includes: signals from a transmitter are received by a receiving array which includes a first sub-array and a second sub-array, wherein the first sub-array includes M uniformly arranged array elements, the second sub-array includes N uniformly arranged array elements, M and N are coprime integers, and N≥0; a signal received by each array element in the receiving array is input into a constructed model, and a covariance matrix is output after processing the signal via the model; a virtual array is constructed at a receiver, wherein a virtual array element in the virtual array is a second-order statistic (Continued)

calculated according to the covariance matrix; and a frequency is randomly selected for each virtual array element from a frequency set of the virtual array, so as to form a beam pattern.

17 Claims, 9 Drawing Sheets

(56) References Cited

FOREIGN PATENT DOCUMENTS

| | | |
|---|---|---|
| CN | 107104720 A | 8/2017 |
| CN | 108254740 A | 7/2018 |
| CN | 110133631 A | 8/2019 |
| CN | 110456334 A | 11/2019 |
| CN | 112511209 A | 3/2021 |
| EP | 3659268 A1 | 6/2020 |

OTHER PUBLICATIONS

Moeness G. Amin, Fauzia Ahmad, Yimin D. Zhang, Co-Prime Frequency and Aperture Design for HF Surveillance, Wideband Radar Imaging, and Nonstationary Array Processing, Final Technical Report, Villanova University, Mar. 2018 (Year: 2018).*

Si Qin, Yimin D. Zhang , Moeness G. Amin, "Multi-target Localization Using Frequency Diverse Coprime Arrays with Coprime Frequency Offsets", 2016 IEEE Radar Conference (RadarConf), 2016 (Year: 2016).*

Yimin Liu, Hang Ruan, Lei Wang, and Arye Nehorai, "The Random Frequency Diverse Array: A New Antenna Structure for Uncoupled Direction-Range Indication in Active Sensing", IEEE Journal of Selected Topics in Signal Processing, vol. 11, No. 2, Mar. 2017 (Year: 2017).*

Ni et al., Enhanced Range-Dependent Beampattern Using Frequency Diverse Padded Coprime Array, 2021 CIE International Conference on Radar (Radar), School of Information Science and Engineering, Southeast University Purple Mountain, Dec. 15-19, 2021 (Year: 2021).*

Ni et al., Range-Dependent Beamforming Using Space-Frequency Virtual Difference Coarray, School of Information Science and Engineering, Southeast University, Purple Mountain Laboratories, Jun. 18, 2021 (Year: 2021).*

Yi Liao, Wen-QinWang and Zhi Zheng, Frequency Diverse Array Beampattern Synthesis Using Symmetrical Logarithmic Frequency Offsets for Target Indication, IEEE Transactions on Antennas and Propagation, vol. 67, No. 5, May 2019 (Year: 2019).*

Cheng Wang, Zheng Li, Xiaofei Zhang, FDA-MIMO for joint angle and range estimation: unfolded coprime framework and parameter estimation algorithm, IET Radar, Sonar & Navigation, College of Electronic and Information Engineering, Nanjing University of Aeronautics and Astronautics, Apr. 22, 2020 (Year: 2020).*

Kaikai Yang, Sheng Hong , Qi Zhu, and Yanheng Ye, Maximum Likelihood Angle-Range Estimation for Monostatic FDA-MIMO Radar with Extended Range Ambiguity Using Subarrays, Hindawi International Journal of Antennas and Propagation, vol. 2020, Sep. 8, 2020 (Year: 2020).*

Zhuang Long. "Study On the Beampattern Optimization for Multiple-Input Multiple-Output Radar" ADissertation Submitted to Shanghai Jiao Tong University for the Degree of Philosophy Doctor. School of Electronic, Information and Electrical Engineering Shanghai Jiao Tong University. Shanghai, P.R.China. Oct. 2009.

Juanjuan Chen. "A Study on Target Parameters Estimation Method of Frequency Diverse Array MIMO Radar" A thesis submitted to Xidian University in partial fulfillment of the requirements for the degree of Master in Signal and Information Processing. Jun. 2018.

* cited by examiner

BEAM CONTROL METHOD AND SYSTEM OF ARRAY ANTENNA BASED ON FREQUENCY DIVERSITY, AND BEAM CONTROLLER

TECHNICAL FIELD

The present disclosure relates to the technical field of communications, and more particularly, to a beam control method of an array antenna based on a frequency diversity.

BACKGROUND

A Frequency Diverse Array (FDA for short) has always been a research hotspot in the field of radars since it was proposed by Antonil et al in 2006. Unlike with traditional phased array antennas, the FDA introduces a carrier frequency difference on each array element, thereby providing a beam pattern related to distance and angle, which makes the FDA have advantages over phased arrays such as distance dependency resistance and the like. However, a linear FDA with uniformly increasing frequency has an angle-distance coupling problem in the case of a far-field beam pattern, which makes the array energy to form an S-shaped distribution in the space, resulting in blurred positioning.

At present, people have proposed a large number of non-linearly increasing frequency offset solutions to obtain spatial focusing beam patterns. For example, Liu Yimin proposed a method of a random frequency diversity array (RFDA for short), in which an analytical expression of a beam pattern is analyzed. According to the method, the carrier frequency offset of each array element is randomly allocated in a uniform linear array, so as to realize an angle-distance decoupled beam mode. However, this random frequency offset method needs to continuously change the carrier frequency of each transmitting unit, therefore the requirements for radio frequency hardware are very high, thereby increasing the difficulty of engineering implementation.

Therefore, it is necessary to propose an improved frequency diversity array solution.

SUMMARY

In view of this, the present disclosure provides an improved beam control method of an array antenna based on frequency diversity. According to one aspect of the present disclosure, the provided beam control method of the array antenna based on frequency diversity includes: receiving signals from a transmitter by a receiving array which includes a first sub-array and a second sub-array, wherein the first sub-array includes M uniformly arranged array elements, the second sub-array includes N uniformly arranged array elements, M and N are coprime integers, M≥0, and N≥0; inputting, into a constructed model, a signal received by each array element in the receiving array, and outputting a covariance matrix after processing the signal via the model, wherein the model is related to a received signal vector, a steering vector and target scattering power; constructing a virtual array at a receiver, wherein a virtual array element in the virtual array is a second-order statistic calculated according to the covariance matrix of the receiving array; and randomly selecting a frequency for each virtual array element from a frequency set of the virtual array, so as to form a beam pattern, wherein the frequency in the frequency set is a sum of a reference frequency and A times of unit frequency offset, A is selected from a difference set of a first array and a second array, the first array includes E elements, the second array includes F elements, E and F are coprime integers, E≥0, and F≥0.

In some examples of the beam control method of the array antenna based on frequency diversity, when Q irrelevant far-field point targets are included and a qth far-field point target is located in a two-dimensional polar coordinate system, the model is:

$$R_x = E[x(t)x^H(t)] = A_{p,f} R_d A_{p,f}^H + \sigma_n^2 I_{M+N-1}$$

wherein, q is an integer and $1 \leq q \leq Q$, $R_x$ represents the covariance matrix output by the model, x(t) represents the received signal vector, $A_{pf}$ represents a matrix of the steering vector, $R_d$ represents the target scattering power, $\sigma_n^2$ represents a power of Gaussian noise, and $I_{M+N-1}$ represents a unit matrix in a dimension of M+N−1;

$$x(t) = \sum_{q=1}^{Q} s_q(t) r_{p,f}(\theta_q, R_q) + n(t) = A_{p,f} S(t) + n(t)$$

wherein, n(t) represents a Gaussian white noise, and:

$$r_{p,f}(\theta_q, R_q) = r_p(\theta_q) \otimes r_f(R_Q)$$

$$r_p(\theta_q) = [r_p^{(1)}(\theta_q), \ldots, r_p^{(M+N-1)}(\theta_q)]$$

$$r_f(R_q) = [r_f^{(1)}(R_q), \ldots, r_f^{(M+N-1)}(R_q)]$$

$$A_{p,f} = [r_{p,f}(\theta_1, R_1), \ldots, r_{p,f}(\theta_Q, R_Q)]$$

$$S(t) = [s_1(t), \ldots, s_Q(t)]^T$$

wherein, coordinates of the qth far-field point target in the two-dimensional polar coordinate system are $(\theta_q, R_q)$, S(t) represents a signal source vector matrix, $S_n(t)$ represents a nth signal source vector, $1 \leq n \leq Q$, $A_{pf}$ represents a matrix of the steering vector, $r_{pf}$ represents a steering vector related to an incident angle, $r_f$ represents a steering vector related to a signal source distance, $r_{pf}$ is equal to a Kronecker product of $r_p$ and $r_f$, and represents a total steering vector.

Further, in some other examples of the beam control method of the array antenna based on frequency diversity, when far-field point targets are located in the two-dimensional polar coordinate system and the virtual array is formed at another position by means of beam forming, the signal expression of the Ith virtual array element among the virtual array elements in the virtual array is:

$$y_l(u, v) = \frac{1}{L} \exp(-J\pi l u + J4\pi m_l v)$$

wherein, $m_l$ represents a random variable, $u = \sin(\tilde{\theta} - \theta_q)$ and $v = \Delta f(\tilde{R} - R_q)/c$, u and v are respectively substitution symbols for normalizing θ and R, Δf represents a unit frequency offset, c represents a light speed, $(\tilde{\theta}, \tilde{R})$ represents coordinates of the Ith virtual array element at the another position, L represents the number of the virtual array elements in the virtual array, the Ith virtual array element refers to any virtual array element among the virtual array elements, and $\mathop{j}\limits$ represents a square root of −1.

As at least one alternative embodiment, in the illustrated beam control method of the array antenna based on frequency diversity, signals to be received by the receiving array are transmitted on the transmitter at different frequencies in the frequency set.

According to yet another aspect of the present disclosure, further provided is an antenna system based on a frequency diversity array, the antenna system includes a first sub-array and a second sub-array, which are uniformly arranged, wherein the first sub-array is configured to include M uniformly arranged array elements, the second sub-array includes N uniformly arranged array elements, M and N are coprime integers, M≥0, and N≥0, and the antenna system is configured to execute the beam control method of the array antenna based on frequency diversity in various above examples.

According to still another aspect of the present disclosure, further provided is a beam controller of an array antenna based on frequency diversity, including a processor and a memory, wherein the memory is configured to store instructions, and the processor is configured to implement, when executing the instructions stored in the memory, the beam control method of the array antenna based on frequency diversity in various above examples.

According to an additional aspect of the present disclosure, provided is a beam control system of an array antenna based on frequency diversity. The system includes a receiving array, a first model and a second model. The receiving array includes a first sub-array and a second sub-array, and is configured to receive signals from a transmitter, wherein the first sub-array includes M uniformly arranged array elements, the second sub-array includes N uniformly arranged array elements, M and N are coprime integers, M≥0, and N≥0. The first model is connected with each array element in the receiving array, and the first model is configured to process a signal received by the array element connected thereto and output a covariance matrix, wherein the first model is related to a received signal vector, a steering vector and target scattering power. The second model is configured to take a second-order statistic calculated by the covariance matrix as a virtual array element, so as to construct a virtual array composed of the virtual array element; and the second model is configured to randomly select a frequency for each virtual array element from a frequency set of the virtual array, so as to form a beam pattern. In this example, the frequency in the frequency set is the sum of a reference frequency and A times of unit frequency offset, wherein A is selected from a difference set of a first array and a second array, the first array includes E elements, the second array includes F elements, E and F are coprime integers, E≥0, and F≥0.

In some examples of the beam control system of the array antenna based on frequency diversity, when Q irrelevant far-field point targets are included and a qth far-field point target is located in a two-dimensional polar coordinate system, the first model is:

$R_x = E[x(t)x^H(t)] = A_{p,f} R_d A_{p,f}^H + \sigma_n^2 I_{M+N-1}$ wherein, q is an integer and 1≤q≤Q, $R_x$ represents the covariance matrix output by the model, x(t) represents the received signal vector, $A_{p,f}$ represents a matrix of the steering vector, $R_d$ represents the target scattering power, $\sigma_n^2$ represents a power of Gaussian noise, and $I_{M+N-1}$ represents a unit matrix in a dimension of M+N−1;

$$x(t) = \sum_{q=1}^{Q} s_q(t) r_{p,f}(\theta_q, R_q) + n(t) = A_{p,f} S(t) + n(t)$$

wherein, n(t) represents a Gaussian white noise, and:

$r_{p,f}(\theta_q, R_q) = r_p(\theta_q) \otimes r_f(R_q)$ $r_p(\theta_q) = [r_p^{(1)}(\theta_q), \ldots, r_p^{(M+N-1)}(\theta_q)]$ $r_f(R_q) = [r_f^{(1)}(R_q), \ldots, r_f^{(M+N-1)}(R_q)]$ $A_{p,f} = [r_{p,f}(\theta_1, R_1), \ldots, r_{p,f}(\theta_Q, R_Q)]$ $S(t) = [s_1(t), \ldots, s_Q(t)]^T$ wherein, coordinates of the qth far-field point target in the two-dimensional polar coordinate system are ($\theta_q$, $R_q$), S(t) represents a signal source vector matrix, $S_n(t)$ represents the nth signal source vector, 1≤n≤Q), $A_{p,f}$ represents a matrix of the steering vector, $r_p$ represents a steering vector related to an incident angle, $r_f$ represents a steering vector related to a signal source distance, $r_{p,f}$ is equal to a Kronecker product of $r_p$ and $r_f$, and represents a total steering vector.

Further, in some other examples of the beam control system of the array antenna based on frequency diversity, when far-field point targets are located in the two-dimensional polar coordinate system and the virtual array is formed at another position by means of beam forming, the second model constructs the virtual array including L virtual array elements, and a signal expression of the Ith virtual array element among the virtual array elements in the virtual array is:

$$y_l(u, v) = \frac{1}{L} \exp(-J\pi l u + J 4\pi m_l v)$$

wherein, $m_l$ represents a random variable, $u = \sin(\tilde{\theta} - \theta_q)$ and $v = \Delta f(\tilde{R} - R_q)/c$, u and v are respectively substitution symbols for normalizing θ and R, Δf represents a unit frequency offset, c represents a light speed, ($\tilde{\theta}$, $\tilde{R}$) represents the coordinates of the Ith virtual array element at the another position, L represents the number of the virtual array elements in the virtual array, the Ith virtual array element refers to any virtual array element among the virtual array elements, and $\mathcal{J}$ represents a square root of −1.

In some examples of the beam control system of the array antenna based on frequency diversity, the system further includes a transmission control module, configured to cause an antenna to transmit signals at different frequencies in the frequency set, wherein the signals are to be received by the receiving array.

According to various solutions of the present disclosure, the virtual array is generated by using the second-order statistic of the covariance matrix of the array antenna based on frequency diversity, the virtual array elements corresponding to different virtual frequencies are generated, different virtual frequencies corresponding to the array elements in a virtual domain are randomly selected, and distance-angle decoupling and beam focusing are realized.

BRIEF DESCRIPTION OF THE DRAWINGS

FIG. 5a and FIG. 5b are schematic diagrams of a coprime frequency division structure, wherein FIG. 5a shows an example of an array structure of an array with a coprime physical domain and frequency diversity, and FIG. 5b shows an example of an array structure with a coprime virtual domain and frequency diversity.

FIG. 9a and FIG. 9b respectively illustrate beam patterns when a far-field point target at (3 km, 20°) is tracked, wherein FIG. 9a is a beam pattern of a beam in the physical domain, and FIG. 9b is a beam pattern formed by randomly selecting frequency offsets (also referred to herein as frequency offsets or the value of a frequency offset) in the virtual domain.

FIG. 10a and FIG. 10b respectively illustrate beam patterns of a plurality of far-field point targets located at (3 km, 40°) and (3 km,40°), wherein FIG. 10a is a beam pattern in the physical domain, and FIG. 10b is a beam pattern formed by randomly selecting frequencies in the virtual domain.

DETAILED DESCRIPTION OF THE EMBODIMENTS

The present disclosure will be described in detail below with reference to the drawings. It should be noted that the described embodiments are merely illustrative rather than limiting the present disclosure.

Figure 1:
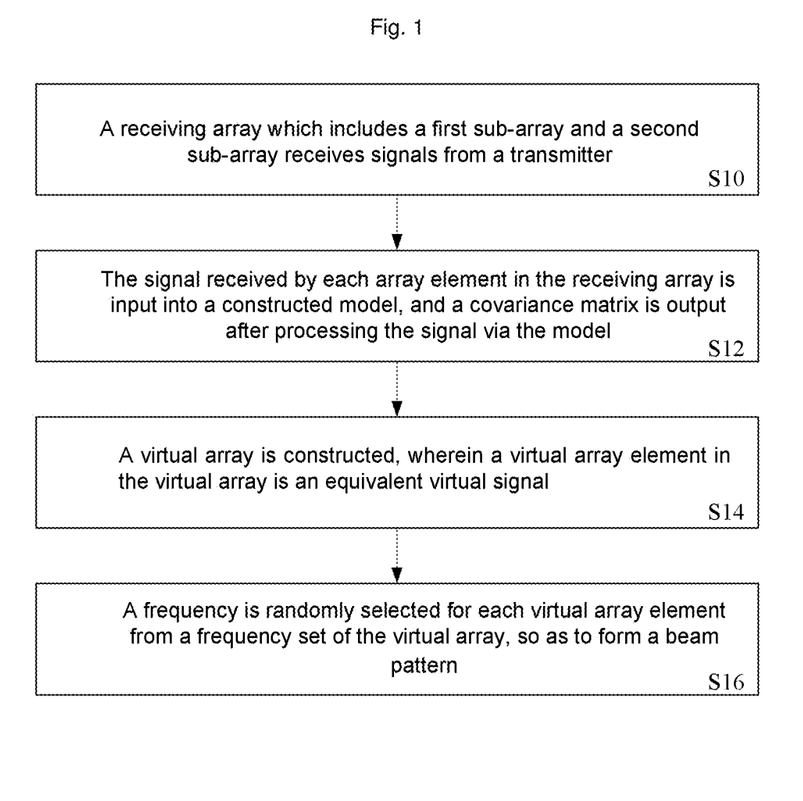
FIG. 1 is a flowchart of a beam forming method based on a frequency diversity array (FDA) according to an example of the present disclosure.

FIG. 1 is a flowchart of a beam control method of an array antenna based on a frequency diversity array (FDA) according to an example of the present disclosure. As shown in the figure, in step S10, a receiving array which includes a first sub-array and a second sub-array receives signals from a transmitter, wherein the first sub-array includes M uniformly arranged array elements, the second sub-array includes N uniformly arranged array elements, M and N are coprime integers, M≥0, and N≥0; and the receiving array is a sparse matrix in which array elements of each sub-array are uniformly arranged.

As an example, in the first sub-array, an array element interval between adjacent array elements is N×d, and in the second sub-array, an array element interval between adjacent array elements is M×d, wherein the size of d is half of a wavelength. In this example, the first sub-array and the second sub-array share the first array element, therefore, the total number of array elements of the receiving array is N+M−1.

Figure 2:
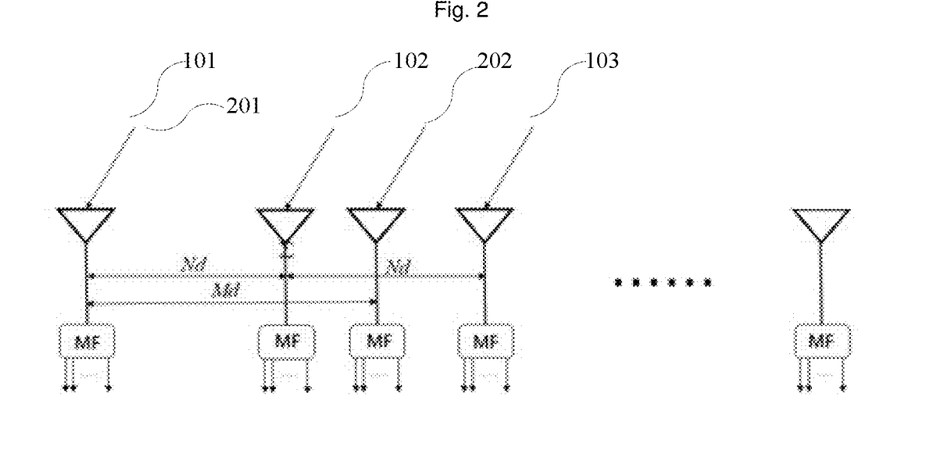
FIG. 2 is a schematic diagram of a receiver of an FDA-based coprime antenna array system according to an example of the present disclosure.

FIG. 2 is a schematic diagram of an FDA-based antenna array according to an example of the present disclosure. FIG. 2 is intended to illustrate, by taking several schematic array elements as an example, a coprime antenna array structure including N+M−1 array elements, and is not intended to limit the number and specific structure of the array antenna. As shown in the figure, each antenna is connected with a matched filter (MF for short). The array element interval between an array element 101 of the first sub-array and an array element 102 of the first sub-array is N×d, and the array element interval between the array element 102 of the first sub-array and an array element 103 of the first sub-array is N×d; and the array element interval between an array element 201 of the second sub-array (which is the same array element as the array element 101 of the first sub-array) and an array element 202 of the second sub-array is M×d.

In step S12, the signal received by each array element in the receiving array is input into a constructed model, and a covariance matrix is output after the signal is processed via the model, wherein the model is related to a received signal vector, a steering vector and target scattering power. Exemplarily, the constructed model may be arranged in a data processing device or a data processing module which is connected with each array element; or, a data processing module provided with the constructed model is integrated in a receiving antenna array, and the like. According to the example, when there are Q irrelevant far-field point targets and the qth (q is selected from integers 1, 2, . . . , Q) far-field point target is located in a two-dimensional polar coordinate system, by way of illustration and not limitation, the model is shown in an expression (1). The output of the model is a covariance matrix of a vector x, wherein x represents the received signal vector, and since there are M+N−1 antennas in total, and each antenna receives M+N−1 signals with different frequencies, a received signal vector in the dimension of (M+N−1) 2×1 is finally formed. The expression (1) is as follows:

$$R_x = E[x(t)x^H(t)] = A_{p,f} R_d A_{p,f}^H + \sigma_n^2 I_{M+N-1}$$

wherein, q is an integer and 1≤q≤Q, $R_d$ represents the target scattering power, $\sigma_n^2$ represents the power of a Gaussian noise, 1≤n≤Q, and n is an integer; $R_x$ represents the covariance matrix output by the model, x(t) represents the received signal vector, $A_{pf}$ represents a matrix of the steering vector, and $I_{M+N-1}$ represents a unit matrix in the dimension of M+N−1. As an example, $R_d = \text{diag}\{\sigma_1^2, \ldots, \sigma_Q^2\}$, $\text{diag}\{\sigma_1^2, \ldots, \sigma_Q^2\}$ represents constructing a diagonal matrix by using Q pieces of Gaussian noise power in the brackets as main diagonal elements.

x(t) in the expression (1) is processed according to an expression (2) to obtain:

$$x(t) = \sum_{q=1}^{Q} s_q(t) r_{p,f}(\theta_q, R_q) + n(t) = A_{p,f} S(t) + n(t) \quad (2)$$

In the expression (2), n(t) represents the Gaussian white noise:

$$R_x = E[x(t)x^H(t)] = A_{p,f} R_d A_{p,f}^H + \sigma_n^2 I_{M+N-1}$$

In the expression (3), the coordinates of the qth far-field point target in the two-dimensional polar coordinate system are ($\theta_q$, $R_q$), and the origin of the polar coordinate system is the first array element 101 (that is, the first array element 201 of the second sub-array) in the array as shown in FIG. 2; S(t) represents a signal source vector matrix, $S_n(t)$ represents the nth signal source vector, and $1 \leq n \leq Q$; and $A_{pf}$ represents the matrix of the steering vector, $r_p$ represents a steering vector related to an incident angle, $r_f$ represents a steering vector related to a signal source distance, $r_{pf}$ is equal to a Kronecker product of $r_p$ and $r_f$, and represents a total steering vector.

Here, for the N+M−1 array elements, a coprime number set corresponding to the array element positions of the first sub-array and the second sub-array is as shown in an expression (4):

$$P_1 = \{s_1 | s_1 = Nm, m = 0, 1, \ldots, M-1\}$$

$$P_2 = \{s_2 | s_2 = Mn, n = 0, 1, \ldots, N-1\} \quad (4)$$

wherein, a difference set of $P_1$ and $P_2$ is further defined as the form of an expression (5):

$$P_1 = \{s | s = \pm(s_1 - s_2), s_1 \in P_1 s_2 \in P_2\} \quad (5)$$

wherein, $s_1$ and $s_2$ in the expression (4) and the expression (5) respectively represent the positions of the array elements in the first sub-array and the second sub-array, and $P_1$ and $P_2$ respectively represent sets of $s_1$ and $s_2$. s represents the position corresponding to each array element of the total array, and P represents a set of s. The position of the array element may be expressed as:

$$D = (P_1 \cup P_2)d. \quad (6)$$

wherein, $d = \lambda/2$ represents a unit array element interval, $\lambda$ represents a wavelength, and D represents the position of the array element.

If M=3 and N=5, the positions of the array elements are: P1=(0, 5, 10), and P2={0, 3, 6, 9, 12}, then D is {0d, 3d, 5d, 6d, 9d, 10d, 12d}.

Further, when there are Q irrelevant far-field point targets and the qth far-field point target is located in the two-dimensional polar coordinate system, the expression (2) may be processed according to the following process to obtain:

$$\begin{aligned} x_{k,l}(t) &= \sum_{q=1}^{Q} s_q(t) \exp\left(J\frac{4\pi}{\lambda_k} R_q\right) \exp\left(-J\frac{2\pi p_l d}{\lambda_k} \sin\theta_q\right) + n_{k,l}(t) \quad (7) \\ &= \sum_{q=1}^{Q} s_q(t) \exp\left(J\frac{4\pi f_k}{c} R_q\right) \exp \\ & \quad \left(-J\frac{\pi p_l(f_0 + \varepsilon_k \Delta f)}{f_0} \sin\theta_q\right) + n_{k,l}(t) \\ &= \sum_{q=1}^{Q} s_q(t) r_p^{(k)}(\theta_q) r_f^{(l)}(R_q) + n_{k,l}(t) \end{aligned}$$

wherein, x(t) represents the received signal vector, since there are M+N−1 antennas in total, and each antenna receives E+F−1 signals with different frequencies, a received signal vector in the dimension of (M+N−1)×(E+F−1)×1 is finally formed; and the subscript k and l of x(t) are respectively used for distinguishing different frequencies and different receiving array elements, for example, $x_{k,l}(t)$ corresponds to the received signal vector of the lth antenna and the kth carrier frequency, and $P_1 d$ (i.e., $P_1 \times d$) represents the distance between the lth array element and the first array element. $\lambda_k = c/f_k$ represents a wavelength corresponding to the carrier frequency $f_k$, c represents a light propagation speed, and $s_q(t)$ represents a complex scattering coefficient $n_{k,l}(t)$ represents an additive white Gaussian noise. For $x_{k,l}(t)$, $x_{k,l}(t)$ under different values of k and l are superposed to obtain a vector expression thereof. When k is valued from/to E+F−1, and l is valued from 1 to M+N−1, the dimension of the received signal vector is (M+N−1)×(E+F−1)×1, such that the mathematical expression of the received signal vector is the expression (2). Here, E and F are coprime integers, both E and F are greater than or equal to 0, and E and F will be described below. It should be noted that, in the description of the present disclosure, the description is continued by taking E=M and F=N as an example, but the values of E and F are not required to be the same as the values of M and N. It should be noted that in practical applications, the expression (1) described above may be replaced with K snapshots to estimate the covariance matrix, that is, as shown in the following expression (8).

$$\hat{R}_x = \frac{1}{K} \sum_{t=1}^{K} x(t) x^H(t) \quad (8)$$

Simply speaking, $\hat{R}_x$ represents the data of the array elements in the covariance matrix Rx.

In step S14, a virtual array is constructed at a receiver, a virtual array element in the virtual array is an equivalent virtual signal, and the equivalent virtual signal is a second-order statistic calculated by the covariance matrix. In step S16, a frequency is randomly selected for each virtual array element from a frequency set of the virtual array, so as to form a beam pattern, wherein the frequency in the frequency set is the sum of a reference frequency and A times of unit frequency offset, A is selected from a difference set of a first array and a second array, the first array includes E elements, the second array includes F elements, E and F are coprime integers, E≥0 and F≥0. As described above, the relationship of E and F with M and N may be the same or different, and E=M and F=N are taken as an example for illustration in the example of the present disclosure. The step S14 and the step S16 are described in detail below by way of example rather than limitation. As an example, the data processing device or the data processing module provided with the model mentioned above may be used for executing the step S14 and the step S16.

Different from directly using an RFDA mode in a physical array dimension, since the signal in a virtual domain is processed by a covariance operation, corresponding carrier center frequencies cancel each other. As an example, if the far-field point target is located at $(\theta_q, R_q)$ of polar coordinates and is formed at a position $(\tilde{\theta}, \tilde{R})$ In by means of beam forming, the array element in the virtual array, that is, the signal of the lth virtual array element is shown in an expression (9), and it should be noted that the lth virtual array element refers to any array element in the virtual array:

$$y_l(\theta_q, R_q) = \frac{1}{L} \exp\left(-J\pi l \sin(\tilde{\theta} - \theta_q) + J \frac{4\pi m_l \Delta f}{c}(\tilde{R} - R_q)\right) \quad (9)$$

For the convenience discussion, the above expression is simplified as an expression (10):

$$y_l(u, v) = \frac{1}{L} \exp(-J\pi l u + J 4\pi m_l v) \quad (10)$$

wherein, $m_l$ represents a random variable, $u = \sin(\tilde{\theta} - \theta_q)$ and $v = \Delta f(\tilde{R} - R_q)/c$, u and v are respectively substitution symbols for normalizing θ and R, L represents the number of the virtual array elements in the virtual array, and $j$ represents the square root of −1. The beam mode of a linear array is a mode of adding each array element, therefore, the virtual array may be expressed as an expression (11):

$$Y(u,v) = \sum_{l=0}^{L-1} y_l(u,v) \quad (11)$$

A probability density function of $m_l$ may be expressed as $g(m_l)=1/\tilde{L}$; and $\tilde{L}$ represents the number of randomly selectable frequencies, which is less than or equal to the number of elements in the frequency set.

According to the present disclosure, a random frequency refers to a frequency which may be randomly selected for each virtual array element from the frequency set of the virtual domain of the virtual array. As an example, in step S10, a receiving array located at the receiver receives the signals from the transmitter. According to the example of the present disclosure, the transmitter is configured to transmit frequency diversity signals, that is, transmit signals to be received by the receiving array at different frequencies in the frequency set. The frequency in the frequency set is the sum of the frequency offset $f_0$ and A times of unit frequency offset, and the transmission frequency F is obtained according to an expression (12):

$$F = f_0 + (P_1 \cup P_2)\Delta f \quad (12)$$

wherein, F represents the frequency in the frequency set of the virtual domain, that is, the transmitter transmits signals at the F transmission frequency, and $\Delta f$ represents the unit frequency offset of the carrier frequency. As an alternative example, $\Delta f$ represents a minimum unit frequency offset of the carrier frequency, P1 and P2 refer to the above expression (4). With E=M=3 and F=N=5 as an example, frequency components for sending the signals are $f_0+0\Delta f$, $f_0+3\Delta f$, $f_0+5\Delta f$, $f_0+6\Delta f$, $f_0+9\Delta f$, $f_0+10\Delta f$, $f_0+12\Delta f$.

Figure 3:
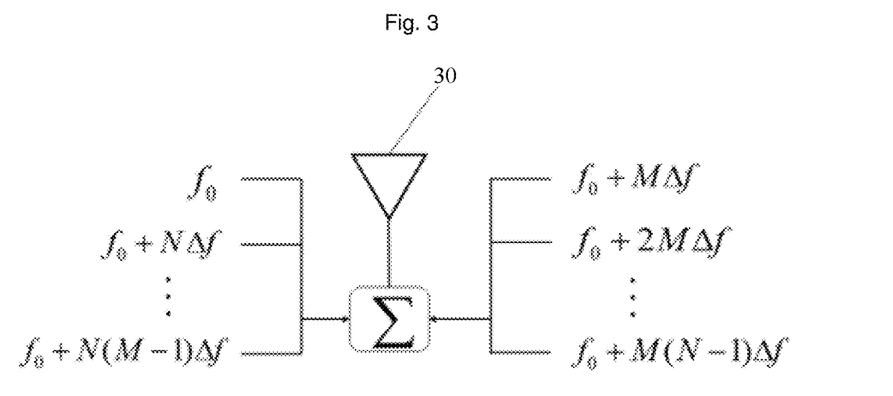
FIG. 3 is a schematic structural diagram of a transmitter according to the present disclosure.

FIG. 3 illustrates a schematic structural diagram of a transmitter according to the present disclosure. As shown in FIG. 3, the transmission frequencies of an antenna 30 are $f_0$, $f_0+N\Delta f$, and $f_0$, $f_0+M\Delta f$, etc.

The discussion on the expression (11) is continued. When $\tilde{L}=L$, the mean and variance of $y_l(u,v)$ are respectively:

$$E[y_l] = \int_{m_l\Delta f \in F} y_l(u,v)g(m_l)dm_l = \frac{1}{L}e^{-J\pi lu} \cdot \Phi(v) \quad (13)$$

$$Var[y_l] = E[|y_l(u,v)|^2] - |E[|y_l(u,v)|]|^2 = \frac{1-|\Phi(v)|^2}{L^2} \quad (14)$$

wherein, $\Phi(v)$ represents a function about $m_l$, which is shown in an expression (15):

$$\Phi(v) = \int_{m_l\Delta f \in F} e^{J4\pi m_l v}g(m_l)dm_l \quad (15)$$

It can be seen that $y_l(u,v)$ meets the Lyapunov center limit theorem, so that the beam mode $Y(u,v)$ of the linear array may achieve better focusing performance on a certain point. That is, the beam formed according to the present disclosure may obtain better focusing performance. In addition, the variance of the beam mode $Y(u,v)$ of the linear array decreases as the number of virtual elements increases, so that the energy distribution is more concentrated.

In summary, in the beam forming method based on the frequency diversity array (FDA) according to the example of the present disclosure, the signal received by the antenna is input into the model, and the model outputs the covariance matrix. The elements $R_{i,j}$ in the ith row and the jth column of the covariance matrix $R_x$ are:

$$R_{i,j} = \sum_{q=1}^{Q} \sigma_q^2 \exp\left(-J\pi(p_i-p_j)\sin\theta_q + J\frac{4\pi(\xi_i-\xi_j)\Delta f}{c}R_q\right) + \sigma_n^2\delta_{i,j} \quad (16)$$

In the expression (16), i,j=1, 2, ..., M+N−1, wherein the subscripts $R_{i,j}$ indicate that the $R_{i,j}$ is in the ith row and the jth column of the covariance matrix $R_x$.

It can be seen that, related statistics in the steering vector is related to a difference set $\{P_i-P_j\}$ of physical array positions of the array elements and a difference set $\{\xi_i-\xi_j\}$ of receiving frequencies. It can be seen that, according to the example of the present disclosure, the degree of freedom (DoF for short) may be significantly improved by reducing the number of redundant items in the difference set of the second-order statistic. Therefore, by means of the beam forming method in which the degree of freedom is improved by fully using the information of the virtual domain, the offset in the random frequency of each independent virtual array element is substantially a frequency difference of physical unit signals. This is different from a traditional RFDA in which the random frequency offset is applied to a physical element to implement enhanced beam forming. In particular, since the present disclosure performs frequency selection on the second-order statistic, the reference carrier frequency in the signal of the virtual domain, that is, the reference frequency $f_0$ is canceled, and then there is only a frequency offset deviation. The following expression shows a derivation process of the expression (16), from which it can be clearly seen that the reference frequency $f_0$ is canceled, and only the frequency offset deviation $\Delta f$ remains:

$$R_{i,j} = E[x_i(t)x_j*(t)]$$

$$= \sum_{q=1}^{Q} \sigma_q^2 \left( e^{-J\frac{2\pi p_i d \sin\theta_q}{\lambda_k} + J\frac{4\pi(f_0+\zeta_i\Delta f)}{c}R_q} \cdot \right.$$

$$\left. e^{-J\frac{2\pi p_j d \sin\theta_q}{\lambda_k} - J\frac{4\pi(f_0+\zeta_j\Delta f)}{c}R_q} \right) + \sigma_n^2\delta_{i,j}$$

$$= \sum_{q=1}^{Q} \sigma_q^2 e^{-J\pi(p_i-p_j)\sin\theta_q + J\frac{4\pi(\xi_i-\xi_j)\Delta f}{c}R_q} + \sigma_n^2\delta_{i,j}$$

In the derivation process of deriving the expression (16), $P_id$ (i.e., Pi×d) represents the distance between the ith array element and the first array element, and $P_jd$ (i.e., $P_j$×d) represents the distance between the jth array element and the first array element.

Figure 4A:
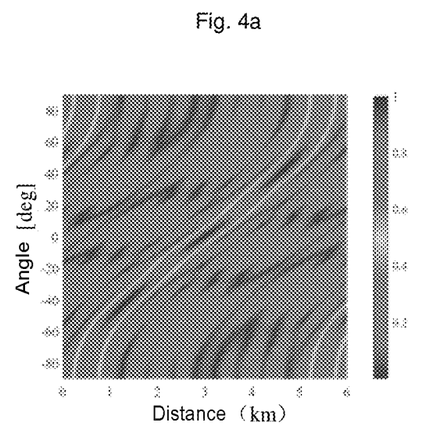
FIG. 4a is a beam pattern formed by sequentially selecting frequency offsets in a virtual domain.
Figure 4B:
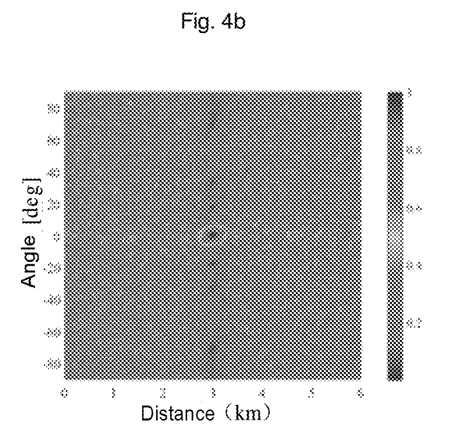
FIG. 4b is a beam pattern formed by randomly selecting frequency offsets in the virtual domain.

As is known, the frequency selection method of each virtual array element has a great influence on the beam arrival direction. The frequency is selected from small to large according to a position sequence of the virtual array elements, and the beam arrival direction in the solution is in an S shape, that is, the distance and angle are seriously coupled together, as shown in FIG. 4a. In the present disclosure, the frequency is randomly selected from frequency elements in the virtual domain, so that a formed beam pattern has a good focusing effect and realizes distance-angle decoupling, and the beam pattern thereof is shown in FIG. 4b.

Figure 5A:
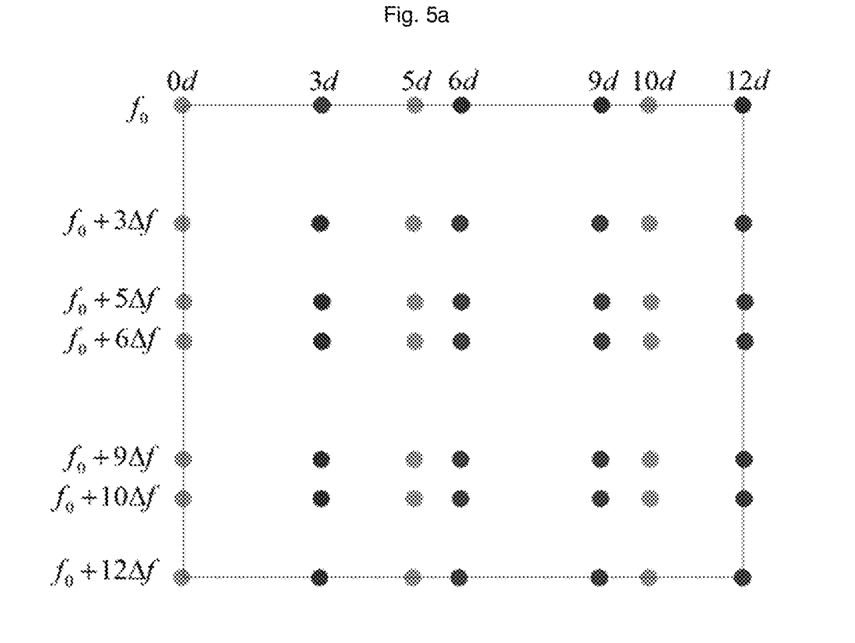
Figure 5B:
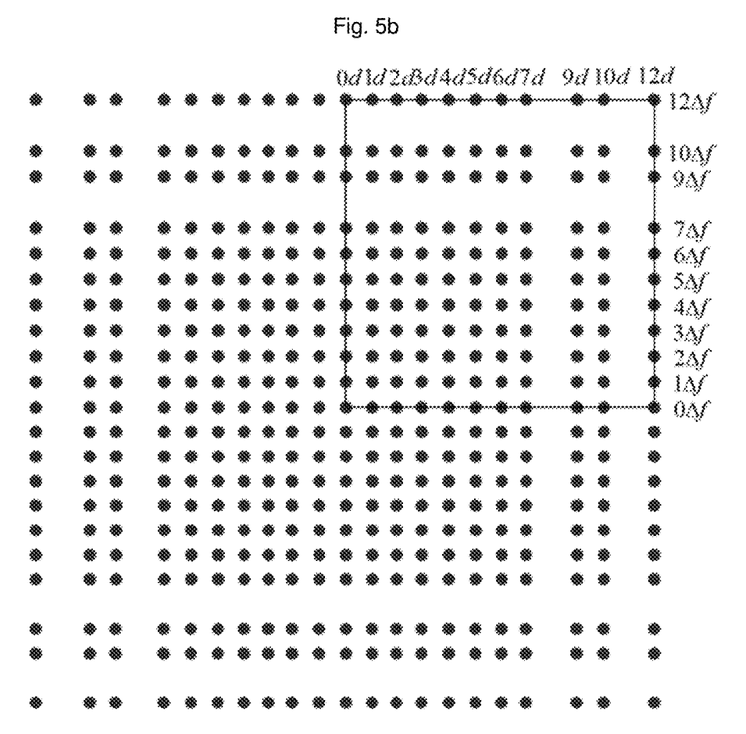

For example, for E=M=3 and F=N=5, the received actual signal frequency is expressed as an array {0, 3, 5, 6, 9, 10, 12}, a difference set array of the array is (0, 1, 2, 3, 4, 5, 6, 7, 9, 10, 12), the frequency of the signal received by each array element is randomly selected from the difference set array. In other words, the antenna of the transmitter for transmitting the signal randomly selects a frequency from this difference set array, so as to transmit the signal. FIG. 5a and FIG. 5b are schematic diagrams of a coprime frequency division structure, wherein FIG. 5a shows an example of an array structure with a coprime physical domain and frequency diversity, and FIG. 5b shows an example of an array structure with a coprime virtual domain and frequency diversity.

Figure 6:
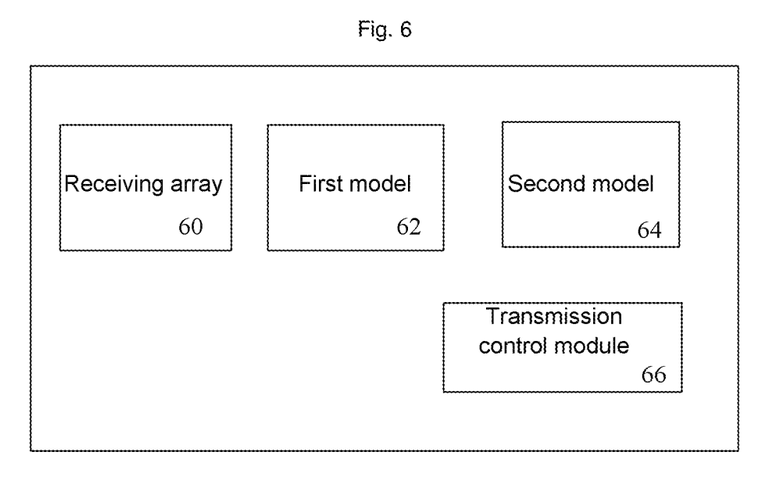
FIG. 6 is a structural diagram of a beam control system of an array antenna based on frequency diversity according to an example of the present disclosure.

The present disclosure further provides a beam control system of an array antenna based on a frequency diversity. FIG. 6 is a structural diagram of a beam control system of an array antenna based on a frequency diversity according to an example of the present disclosure. As shown in the figure, the beam control system includes a receiving array 60, a first model 62, and a second model 64. The receiving array 60 includes a first sub-array and a second sub-array. The receiving array 60 is configured to receive signals from a transmitter, wherein the first sub-array includes M uniformly arranged array elements, the second sub-array includes N uniformly arranged array elements, M and N are coprime integers, M≥0, and N≥0. The first model 62 is connected with each array element in the receiving array. The first model 62 is configured to process a signal received by the array element connected thereto, and output a covariance matrix. The first model 62 is related to a received signal vector, a steering vector and target scattering power. The second model 64 is configured to take a second-order statistic calculated by the covariance matrix as a virtual array element, so as to construct a virtual array; and the second model is configured to randomly select a frequency for each virtual array element from a frequency set of the virtual array, so as to form a beam pattern. The frequency set has been discussed above, and thus details are not described herein again. As an example, the first model 62 is implemented as the expression (1) and the second model 64 is implemented as the expression (10); and these two expressions have also been described in detail, thus will not be repeated described.

According to the example of the present disclosure, the beam control system may further include a transmission control module 66, configured to transmit signals to be received by the receiving array at different frequencies in the frequency set. Simply speaking, the frequency in the frequency set is the sum of a reference frequency $f_0$ and A times of unit frequency offset, wherein A is selected from a difference set of a first array and a second array, the first array includes E elements, the second array includes F elements, E and F are coprime integers, E≥0, and F≥0. The relationship of E and F with M and N has also been described above.

Figure 7:
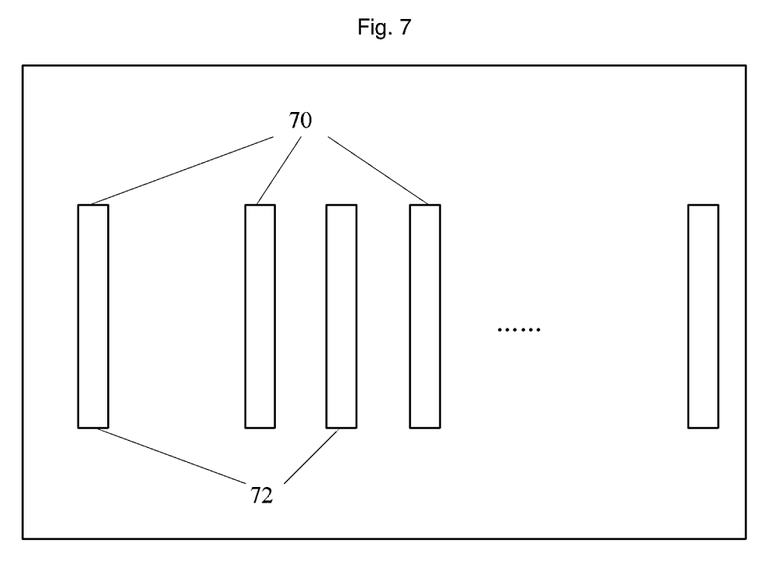
FIG. 7 is a schematic structural diagram of an antenna system based on a frequency diversity array according to an example of the present disclosure.

According to an example of the present disclosure, further provided is an antenna system based on a frequency diversity array. FIG. 7 illustrates a structural diagram of the antenna system according to the example. The antenna system based on the frequency diversity array includes a first sub-array 70 and a second sub-array 72. The first sub-array 70 includes M uniformly arranged array elements, and the second sub-array 72 includes N uniformly arranged array elements. M and N are coprime integers, M≥0, and N≥0. According to the example, the first sub-array and the second sub-array share the first array element, therefore the antenna system includes a sparse array with M+N−1 array elements, wherein the array elements in each sub-array are uniformly arranged. It should be understood that, the M+N−1 array elements are not uniformly arranged, for example, the interval between adjacent array elements of the first sub-array is different from the interval of the adjacent array elements of the second sub-array. The system according to the example of the present disclosure is configured to be able to execute the beam control method of the array antenna based on frequency diversity described in various examples of the present disclosure.

Figure 8:
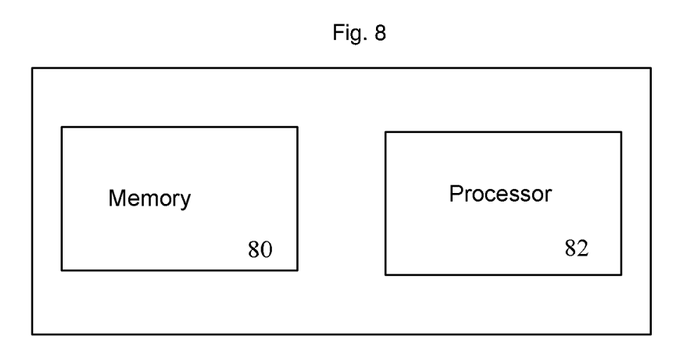
FIG. 8 is a schematic structural diagram of a beam controller of an array antenna based on frequency diversity according to an example of the present disclosure.

According to an example of the present disclosure, further provided is a beam controller of an array antenna based on a frequency diversity. FIG. 8 is a schematic structural diagram of the beam controller. As shown in FIG. 8, the beam controller of the array antenna based on the frequency diversity includes a memory 80 and a processor 82. The memory 80 is configured to store instructions, and the processor 82 is configured to implement, when executing the instructions stored in the memory 80, the beam control method of the array antenna based on frequency diversity described in various examples of the present disclosure.

The beam controller of the array antenna based on the frequency diversity shown in FIG. 8 may be applied to the antenna system based on frequency diversity shown in FIG. 7. With reference to FIG. 8 and FIG. 7, when executing the instructions in the memory 80, the processor 82 controls the antenna system shown in FIG. 7 to execute the beam control method of the array antenna based on the frequency diversity according to the examples of the present disclosure.

Figure 9A:
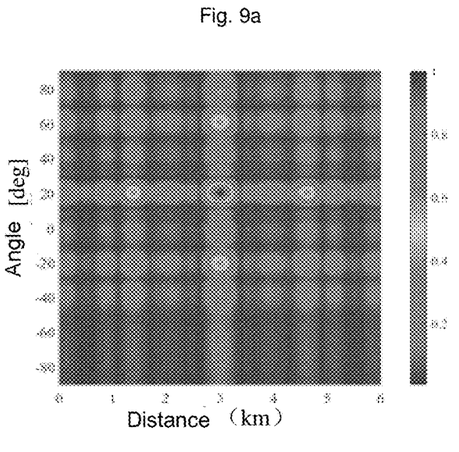
Figure 9B:
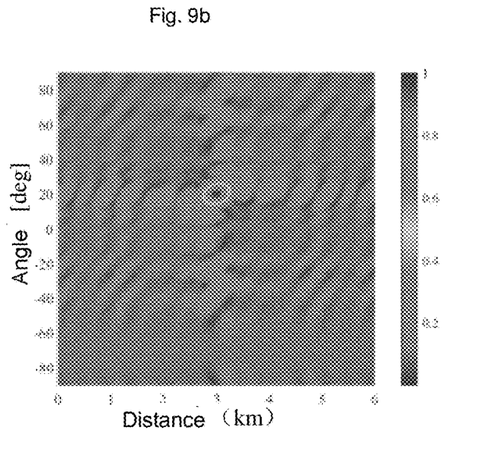

According to the present disclosure, a simulation experiment parameter result is given by taking E=M=3 and F=N=5 as an example. The reference frequency $f_0$ is 8 GHz, and the minimum unit frequency offset Δf=30 kHz. FIG. 9a illustrates a beam pattern in a physical domain when a far-field point target located at (3 km, 20°) is tracked. FIG. 9b illustrates a beam pattern of a beam formed by randomly selecting frequency from a frequency offset in a virtual domain. The result shows that the beam control method of the array antenna based on frequency diversity according to the examples of the present disclosure obtains a better beam direction distribution, such that the energy distribution is more concentrated, and a side lobe is lower.

Figure 10A:
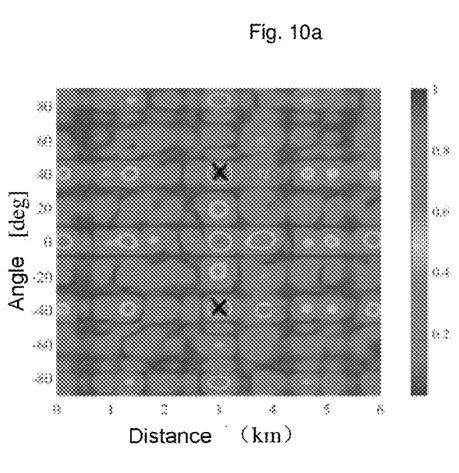
Figure 10B:
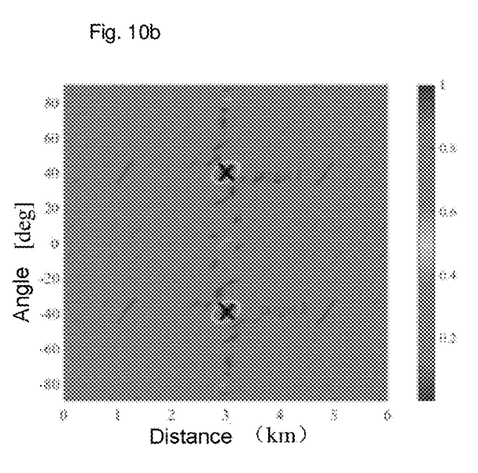

Further, a beam pattern of a plurality of far-field point targets located at (3 km, 40°) and (3 km, −40°) is also given herein, referring to FIG. 10a and FIG. 10b. FIG. 10a is a beam pattern in the physical domain, wherein several remote point targets rise. FIG. 10b is a beam pattern in the virtual domain according to the present disclosure, as shown in the figure, the peak value remains unchanged.

Figure 11:
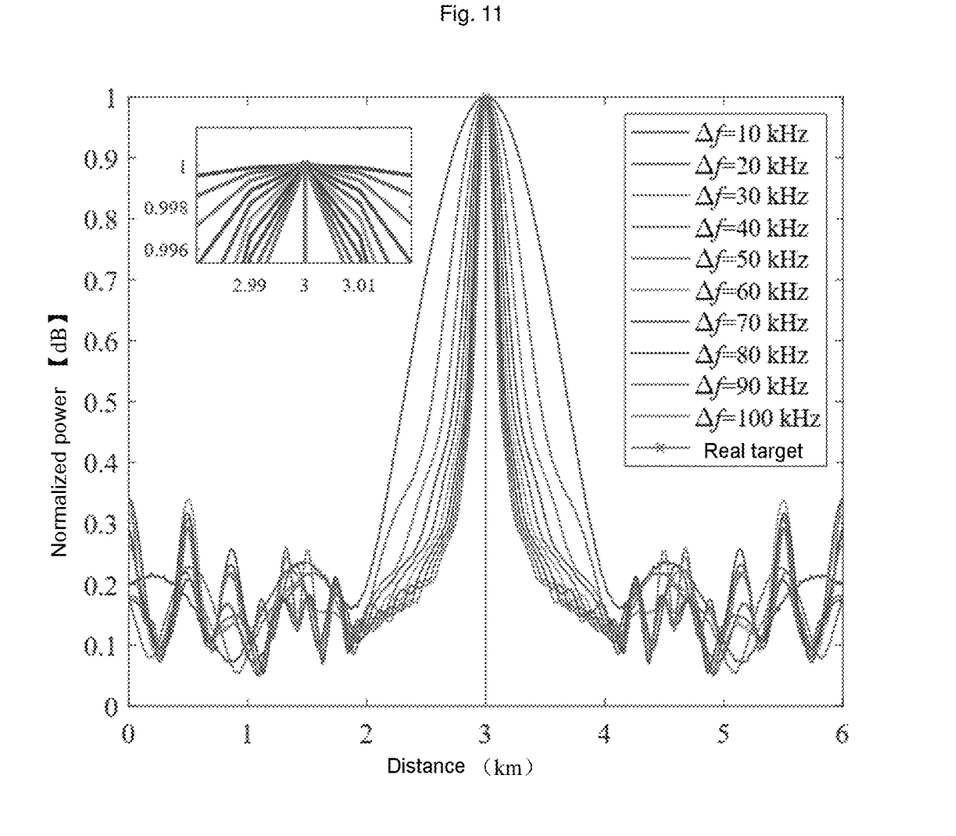
FIG. 11 illustrates a beam pattern in a distance domain.
Figure 12:
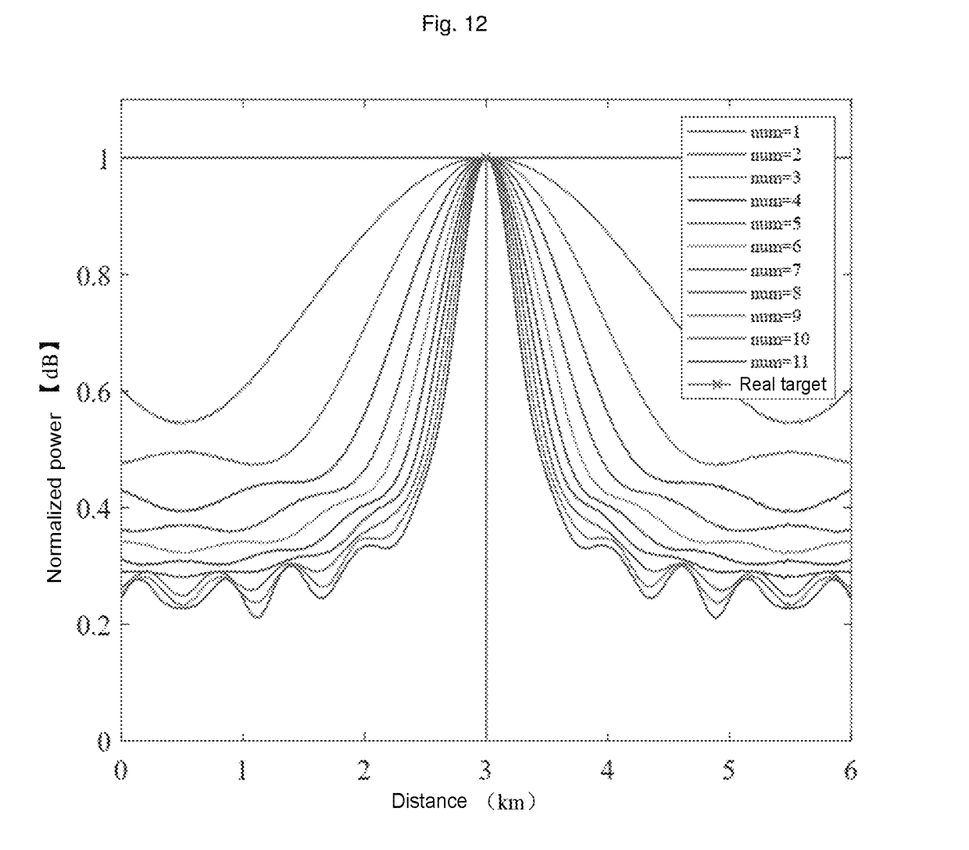
FIG. 12 illustrates the influence of the number of selectable frequency offsets on a beam pattern.

By means of statistical analysis, the relationship between the beam performance and the unit frequency offset and the relationship between the beam performance and the number of selectable frequency offsets may be observed. Since the angular resolution is determined by the aperture of the array, it is mainly focused on the distance dimension herein. FIG. 11 illustrates a beam pattern in a distance domain, which shows the influence of the unit frequency offset on the shaped beam. It can be observed from FIG. 11 that the width of a main lobe decreases as the unit frequency offset $\Delta_f$ increases, which is consistent with a generally considered law that the distance resolution increases as the bandwidth increases. FIG. 12 illustrates the influence of the number of selectable frequency offsets on the beam pattern. By using the covariance matrix of the coprime FDA, the number of selectable frequency offsets used for the array element is increased from 7 to 11 in the virtual domain. As can be seen from FIG. 12, the main lobe becomes narrower as the selectable frequency increases.

Figure 13:
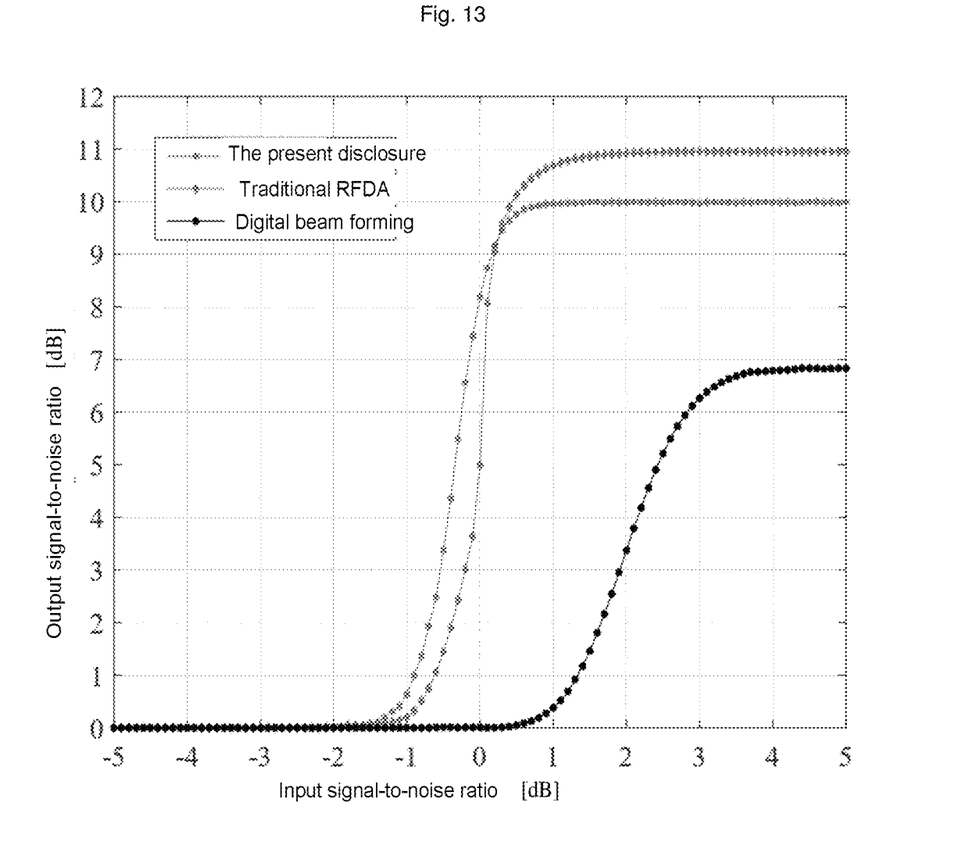
FIG. 13 is a schematic diagram of results of simulating input and output signal-to-noise ratios of three different beam control methods.

FIG. 13 is a schematic diagram of results of simulating input and output signal-to-noise ratios of three different beam control methods, wherein the three methods are respectively a traditional RFDA, a digital beam forming method, and the method according to the present disclosure. In the simulation, the output signal-to-noise ratio is defined as the ratio of the power of the main lobe to the average power. The digital beam forming method is the worst among the three methods. As shown in the figure, the output signal-to-noise ratio of the method according to the present disclosure increases when the input signal-to-noise ratio is equal to −1.2 dB, and reaches 3 dB when the input signal-to-noise ratio is approximately equal to −0.5 dB. Compared with the traditional RFDA method, when the input signal-to-noise ratio is −0.2 dB, the output signal-to-noise ratio of the RFDA method with the same number of array elements and unit frequency offset reaches 3 dB. The numerical results indicate that the performance of the method according to the present disclosure is similar to that of the traditional RFDA method, but since the carrier frequency of the array element is randomly selected by using the second-order statistic instead of changing the same, the method according to the examples of the present disclosure is much simpler to be implemented.

In summary, by executing the beam control method of the antenna array based on the frequency diversity according to the examples of the present disclosure, or by using the beam control system or the beam controller of the antenna array based on the frequency diversity, when the antenna array based on frequency diversity performs distance-angle positioning on a plurality of remote point targets, the height of the side lobe may be effectively inhibited, thereby solving the problem of distance-angle coupling in the frequency diversity array, and effectively reducing the hardware complexity in the design of the antenna system.

A plurality of examples of the present disclosure have been set forth in conjunction with the drawings, but the above examples and embodiments are merely illustrative and not restrictive. For those ordinary skilled in the art, several variations and improvements may be made without departing from the concept of the present disclosure, and all these variations and improvements should be encompassed within the protection scope of the claims of the present disclosure.

What is claimed is:

1. A beam control method of an array antenna based on a frequency diversity, comprising:
   receiving signals from a transmitter by a receiving array which comprises a first sub-array and a second sub-array, wherein the first sub-array comprises M uniformly arranged array elements, the second sub-array comprises N uniformly arranged array elements, M and N are coprime integers, M≥0 and N≥0;
   inputting, into a constructed model, a signal received by each array element in the receiving array, and outputting a covariance matrix after processing the input signal via the model, wherein the model is related to a received signal vector, a steering vector and a target scattering power;
   constructing a virtual array at a receiver, wherein a virtual array element in the virtual array is a second-order statistic calculated according to the covariance matrix; and
   randomly selecting a frequency for each virtual array element from a frequency set of the virtual array, so as to form a beam pattern, wherein the frequency in the frequency set is a sum of a reference frequency and A times of unit frequency offset, A is selected from a difference set of a first array and a second array, the first array comprises E elements, the second array comprises F elements, E and F are coprime integers, and E≥0, and F≥0;
   wherein when Q irrelevent far-field point targets are comprised and a qth far-field point target is located in the two-dimensional polar coordinate system, and a far-field point target is located in the two-dimensional polar coordinate system and the virtual array is formed at another position by means of beam forming, the signal expression of the Ith virtual array element among the virtual array elements in the virtual array is:

$$y_l(u, v) = \frac{1}{L}\exp(-\mathcal{J}\pi l u + \mathcal{J}4\pi m_l v)$$

wherein, $m_l$ represents a random variable, $u=\sin(\tilde{\theta}-\theta_q)$ and $v=\Delta f(\tilde{R}-R_q)/c$, u and v are respectively substitution symbols for normalizing θ and R, q is an integer and 1≤q≤Q, Δf represents a unit frequency offset, c represents a light speed, $(\tilde{\theta}, \tilde{R})$ represents coordinates of the Ith virtual array element at the other position, L represents the number of the virtual array elements in the virtual array, and the Ith virtual array element refers to any virtual array element among the virtual array elements, and $\mathcal{J}$ represents a square root of −1.

2. The method as claimed in claim 1, wherein the model is configured to calculate a mathematical expectation of a product of the received signal vector and a conjugate transpose of the received signal vector, the product of the received signal vector and the conjugate transpose of the received signal vector is also related to the steering vector and the target scattering power, and the output covariance matrix is the mathematical expectation.

3. The method as claimed in claim 2, wherein the model is:

$$R_x = E[x(t)x^H(t)] = A_{p,f} R_d A_{p,f}^H + \sigma_n^2 I_{M+N-1}$$

wherein, $R_x$ represents the covariance matrix output by the model, x(t) represents the received signal vector, $A_{pf}$ represents a matrix of the steering vector, $R_d$ represents the target scattering power, $\sigma_n^2$ represents a power of Gaussian noise, and $I_{M+N-1}$ represents a unit matrix in a dimension of M+N−1;

$$x(t) = \sum_{q=1}^{Q} s_q(t) r_{p,f}(\theta_q, R_q) + n(t) = A_{p,f} S(t) + n(t)$$

wherein, n(t) represents a Gaussian white noise, and:

$$r_{p,f}(\theta_q, R_q) = r_p(\theta_q) \otimes r_f(R_q)$$

$$r_p(\theta_q) = [r_p^{(1)}(\theta_q), \ldots, r_p^{(M+N-1)}(\theta_q)]$$

$$r_f(R_q) = [r_f^{(1)}(R_q), \ldots, r_f^{(M+N-1)}(R_q)]$$

$$A_{p,f}=[r_{p,f}(\theta_1,R_1), \ldots ,r_{p,f}(\theta_Q,R_Q)]$$

$$S(t)=[s_1(t), \ldots ,s_Q(t)]^T$$

wherein, a coordinates of the qth far-field point target in the two-dimensional polar coordinate system are ($\theta_q$, $R_q$), S(t) represents a signal source vector matrix, $S_n(t)$ represents the nth signal source vector, $1 \le n \le Q$, $A_{pf}$ represents the matrix of the steering vector, $r_p$ represents a steering vector related to an incident angle, $r_f$ represents a steering vector related to a signal source distance, $r_{pf}$ is equal to a Kronecker product of rand $r_f$, and represents a total steering vector.

4. The method as claimed in claim 3, wherein the method further comprises: transmitting signals on the transmitter at different frequencies in the frequency set, wherein the signals are to be received by the receiving array.

5. The method as claimed in claim 4, wherein the method further comprises: transmitting signals on the transmitter at different frequencies in the frequency set, wherein the signals are to be received by the receiving array.

6. The method as claimed in claim 2, wherein the method further comprises: transmitting signals on the transmitter at different frequencies in the frequency set, wherein the signals are to be received by the receiving array.

7. The method as claimed in claims 1, wherein the method further comprises: transmitting signals on the transmitter at different frequencies in the frequency set, wherein the signals are to be received by the receiving array.

8. A beam controller of an array antenna based on a frequency diversity, wherein the beam controller comprises a processor and a memory, the memory is configured to store instructions, and the processor is configured to implement, when executing the instructions stored in the memory, following actions:

receiving signals from a transmitter by a receiving array which comprises a first sub-array and a second sub-array, wherein the first sub-array comprises M uniformly arranged array elements, the second sub-array comprises N uniformly arranged array elements, M and N are coprime integers, $M \ge 0$, and $N \ge 0$;

inputting, into a constructed model, a signal received by each array element in the receiving array, and outputting a covariance matrix after processing the input signal via the model, wherein the model is related to a received signal vector, a steering vector and a target scattering power;

constructing a virtual array at a receiver, wherein a virtual array element in the virtual array is a second-order statistic calculated according to the covariance matrix; and randomly selecting a frequency for each virtual array element from a frequency set of the virtual array, so as to form a beam pattern, wherein the frequency in the frequency set is a sum of a reference frequency and A times of unit frequency offset, A is selected from a difference set of a first array and a second array, the first array comprises E elements, the second array comprises F elements, E and F are coprime integers, $E \ge 0$, and $F \ge 0$;

wherein when Q irrelevent far-field point targets are comprised and a qth far-field point target is located in the two-dimensional polar coordinate system, and a far-field point target is located in the two-dimensional polar coordinate system, and the virtual array is formed at another position by means of beam forming, the signal expression of the Ith virtual array element among the virtual array elements in the virtual array is:

$$y_l(u, v) = \frac{1}{L}\exp(-\mathcal{J}\pi lu + \mathcal{J}4\pi m_l v)$$

wherein, $m_l$ represents a random variable, $u=\sin(\tilde{\theta}-\theta_q)$ and $v=\Delta f(\tilde{R}-R_q)/c$, u and v are respectively substitution symbols for normalizing $\theta$ and R, q is an integer and $1 \le q \le Q$, $\Delta f$ represents a unit frequency offset, c represents a light speed, ($\tilde{\theta}$, $\tilde{R}$) represents coordinates of the Ith virtual array element at the other position, L represents the number of the virtual array elements in the virtual array, and the Ith virtual array element refers to any virtual array element among the virtual array elements, and $\mathcal{J}$ represents a square root of −1.

9. The beam controller of the array antenna based on the frequency diversity as claimed in claim 8, wherein the processor is further configured to implement, when executing the instructions stored in the memory, following actions:

the model is configured to calculate a mathematical expectation of a product of the received signal vector and a conjugate transpose of the received signal vector, the product of the received signal vector and the conjugate transpose of the received signal vector is also related to the steering vector and the target scattering power, and the output covariance matrix is the mathematical expectation.

10. The beam controller of the array antenna based on the frequency diversity as claimed in claim 9, wherein the processor is further configured to implement, when executing the instructions stored in the memory, following actions:

the model is:

$$R_x=E[x(t)x^H(t)]=A_{p,f}R_d A_{p,f}^H+\sigma_n^2 I_{M+N-1}$$

wherein, $R_x$ represents the covariance matrix output by the model, x(t) represents the received signal vector, $A_{pf}$ represents a matrix of the steering vector, $R_d$ represents the target scattering power, $\sigma_n^2$ represents a power of Gaussian noise, and $I_{M+N-1}$ represents a unit matrix in a dimension of M+N−1;

$$x(t) = \sum_{q=1}^{Q} s_q(t) r_{p,f}(\theta_q, R_q) + n(t) = A_{p,f} S(t) + n(t)$$

wherein, n(t) represents a Gaussian white noise, and:

$$r_{p,f}(\theta_Q,R_q)=r_p(\theta_q) \otimes r_f(R_Q)$$

$$r_p(\theta_q)=[r_p^{(1)}(\theta_q), \ldots , r_p^{(M+N-1)}(\theta_q)]$$

$$r_f(R_q)=[r_f^{(1)}(R_q), \ldots ,r_f^{(M+N-1)}(R_q)]$$

$$A_{p,f}=[r_{p,f}(\theta_1,R_1), \ldots ,r_{p,f}(\theta_Q,R_Q)]$$

$$S(t)=[s_1(t), \ldots ,s_Q(t)]^T$$

wherein, coordinates of the qth far-field point target in the two-dimensional polar coordinate system are ($\theta_q$, $R_q$), S(t) represents a signal source vector matrix, $S_n(t)$ represents the nth signal source vector, $A_{pf}$ represents the matrix of the steering vector, $r_p$ represents a steering vector related to an incident angle, $r_f$ represents a steering vector related to a signal source distance, $r_{pf}$ is equal to a Kronecker product of rand $r_f$, and represents a total steering vector.

11. A beam control system of an array antenna based on frequency diversity, wherein the beam control system comprises:
   a receiving array, which comprises a first sub-array and a second sub-array, wherein the receiving array is configured to receive signals from a transmitter, the first sub-array comprises M uniformly arranged array elements, the second sub-array comprises N uniformly arranged array elements, M and N are coprime integers, M≥0, and N≥0;
   a first model, wherein the first model is connected with each array element in the receiving array, and the first model is configured to process a signal received by the array element connected thereto and output a covariance matrix, and the first model is related to a received signal vector, a steering vector and a target scattering power; and
   a second model, which is configured to take a second-order statistic calculated by the covariance matrix as a virtual array element, so as to construct a virtual array; and is configured to randomly select a frequency for each virtual array element from a frequency set of the virtual array, so as to form a beam pattern, wherein
   the frequency in the frequency set is a sum of a reference frequency and A times of unit frequency offset, A is selected from a difference set of a first array and a second array, the first array comprises E elements, the second array comprises F elements, E and F are coprime integers, E≥0 and F≥0;
   wherein when Q irrelevent far-field point targets are comprised and a qth far-field point target is located in the two-dimensional polar coordinate system, and a far-field point target is located in the two-dimensional polar coordinate system, and the virtual array is formed at another position by means of beam forming, the signal expression of the Ith virtual array element among the virtual array elements in the virtual array is:

$$y_l(u, v) = \frac{1}{L}\exp(-\mathcal{J}\pi l u + \mathcal{J}4\pi m_l v)$$

wherein, $m_l$ represents a random variable, $u=\sin(\tilde{\theta}-\theta_q)$ and $v=\Delta f(\tilde{R}-R_q)/c$, u and v are respectively substitution symbols for normalizing θ and R, q is an integer and 1≤q≤Q, Δf represents a unit frequency offset, c represents a light speed, $(\tilde{\theta}, \tilde{R})$ represents coordinates of the Ith virtual array element at the other position, L represents the number of the virtual array elements in the virtual array, and the Ith virtual array element refers to any virtual array element among the virtual array elements, and $\mathcal{J}$ represents a square root of −1.

12. The beam control system as claimed in claim 11, wherein the model is configured to calculate a mathematical expectation of a product of the received signal vector and a conjugate transpose of the received signal vector, the product of the received signal vector and the conjugate transpose of the received signal vector is also related to the steering vector and the target scattering power, and the output covariance matrix is the mathematical expectation.

13. The beam control system as claimed in claim 12, wherein the first model is:

$$R_x = E[x(t)x^H(t)] = A_{pf}R_d A_{pf}^H + \sigma_n^2 I_{M+N-1}$$

wherein, $R_x$ represents the covariance matrix output by the model, x(t) represents the received signal vector, $A_{pf}$ represents a matrix of the steering vector, $R_d$ represents the target scattering power, $\sigma_n^2$ represents a power of Gaussian noise, and $I_{M+N-1}$ represents a unit matrix in a dimension of M+N−1;

$$x(t) = \sum_{q=1}^{Q} s_q(t)r_{p,f}(\theta_q, R_q) + n(t) = A_{p,f}S(t) + n(t)$$

wherein, n(t) represents a Gaussian white noise, and:

$r_{p,f}(\theta_q, R_q) = r_p(\theta_q) \otimes r_f(R_q)$ $r_p(\theta_q) = [r_p^{(1)}(\theta_q), \ldots, r_p^{(M+N-1)}(\theta_q)]$ $r_f(R_q) = [r_f^{(1)}(R_q), \ldots, r_f^{(M+N-1)}(R_q)]$ $A_{p,f} = [r_{p,f}(\theta_1, R_1), \ldots, r_{p,f}(\theta_Q, R_Q)]$ $S(t) = [s_1(t), \ldots, s_Q(t)]^T$ wherein, coordinates of the qth far-field point target in the two-dimensional polar coordinate system are $(\theta_q, R_q)$, S(t) represents a signal source vector matrix, $S_n(t)$ represents the nth signal source vector, 1≤n≤Q, $A_{pf}$ represents the matrix of the steering vector, $r_p$ represents a steering vector related to an incident angle, $r_f$ represents a steering vector related to a signal source distance, $r_{pf}$ is equal to a Kronecker product of rand $r_f$, and represents a total steering vector.

14. The beam control system as claimed in claim 13, wherein the beam control system further comprises:
   a transmission control module, configured to cause an antenna for transmitting to transmit signals at different frequencies in the frequency set, wherein the signals are to be received by the receiving array.

15. The beam control system as claimed in claim 12, wherein the beam control system further comprises:
   a transmission control module, configured to cause an antenna for transmitting to transmit signals at different frequencies in the frequency set, wherein the signals are to be received by the receiving array.

16. The beam control system as claimed in claim 11, wherein the beam control system further comprises:
   a transmission control module, configured to cause an antenna for transmitting to transmit signals at different frequencies in the frequency set, wherein the signals are to be received by the receiving array.

17. The beam control system as claimed in claim 11, wherein the beam control system further comprises:
   a transmission control module, configured to cause an antenna for transmitting to transmit signals at different frequencies in the frequency set, wherein the signals are to be received by the receiving array.

* * * * *